(12) United States Patent
Von Bordelius et al.

(10) Patent No.: US 8,397,345 B2
(45) Date of Patent: Mar. 19, 2013

(54) CASTOR WITH BRAKE DEVICE

(75) Inventors: Ralph Von Bordelius, Herrenberg (DE); Hans-Wilhelm Rottenau, Hechingen (DE)

(73) Assignee: Gross + Froelich GmbH & Co. KG, Weil der Stadt (DE)

( * ) Notice: Subject to any disclaimer, the term of this patent is extended or adjusted under 35 U.S.C. 154(b) by 160 days.

(21) Appl. No.: 12/804,056

(22) Filed: Jul. 13, 2010

(65) Prior Publication Data
US 2011/0010892 A1 Jan. 20, 2011

(30) Foreign Application Priority Data
Jul. 16, 2009 (DE) .......................... 10 2009 033 583

(51) Int. Cl.
*B60B 33/00* (2006.01)
(52) U.S. Cl. ...................................... 16/35 R; 188/1.12
(58) Field of Classification Search .................. 16/35 R, 16/35 D, 18 R; 188/1.12, 69
See application file for complete search history.

(56) References Cited

U.S. PATENT DOCUMENTS

| 1,998,236 | A | * | 4/1935 | Herold | 188/74 |
| 3,162,888 | A | * | 12/1964 | Mobus | 16/35 R |
| 3,571,842 | A | * | 3/1971 | Fricke | 16/35 R |
| 3,890,669 | A | * | 6/1975 | Reinhards | 16/35 R |
| 3,911,525 | A | * | 10/1975 | Haussels | 16/35 R |
| 3,988,800 | A | * | 11/1976 | Sachser | 16/35 R |
| 4,349,937 | A | * | 9/1982 | Fontana | 16/35 R |
| 4,658,466 | A | * | 4/1987 | Vollberg et al. | 16/35 R |
| 4,835,815 | A | * | 6/1989 | Mellwig et al. | 16/35 R |
| 4,998,320 | A | * | 3/1991 | Lange | 16/35 R |
| 5,593,461 | A | * | 1/1997 | Reppert et al. | 29/11 |
| 6,725,501 | B2 | * | 4/2004 | Harris et al. | 16/35 R |

FOREIGN PATENT DOCUMENTS
DE 93 10 568 U1 10/1993

OTHER PUBLICATIONS
Search Report of German Patent Office dated Mar. 18, 2010 (4 pages).

* cited by examiner

*Primary Examiner* — William L. Miller
(74) *Attorney, Agent, or Firm* — Flynn, Thiel, Boutell & Tanis, P.C.

(57) ABSTRACT

The invention relates to a castor having a brake device with a housing (10) with a substantially vertically aligned receiving opening (12) for a runner pin (14) for connecting the castor to an object to be supported by the castor, and having an axle bolt (16) which extends through the housing transversely with respect to the receiving opening and which bears at least one wheel (18, 18'), with the brake device having a brake slide (20) which can be moved by an actuating lever (22) from the outside from a free-running position into a braked position. To provide inter alia a locking facility independently of the rotational position of the wheel, it is proposed according to the invention that the brake slide (20) bears an elastic brake lining (36) which faces toward a braking section (32) of the at least one wheel.

7 Claims, 4 Drawing Sheets

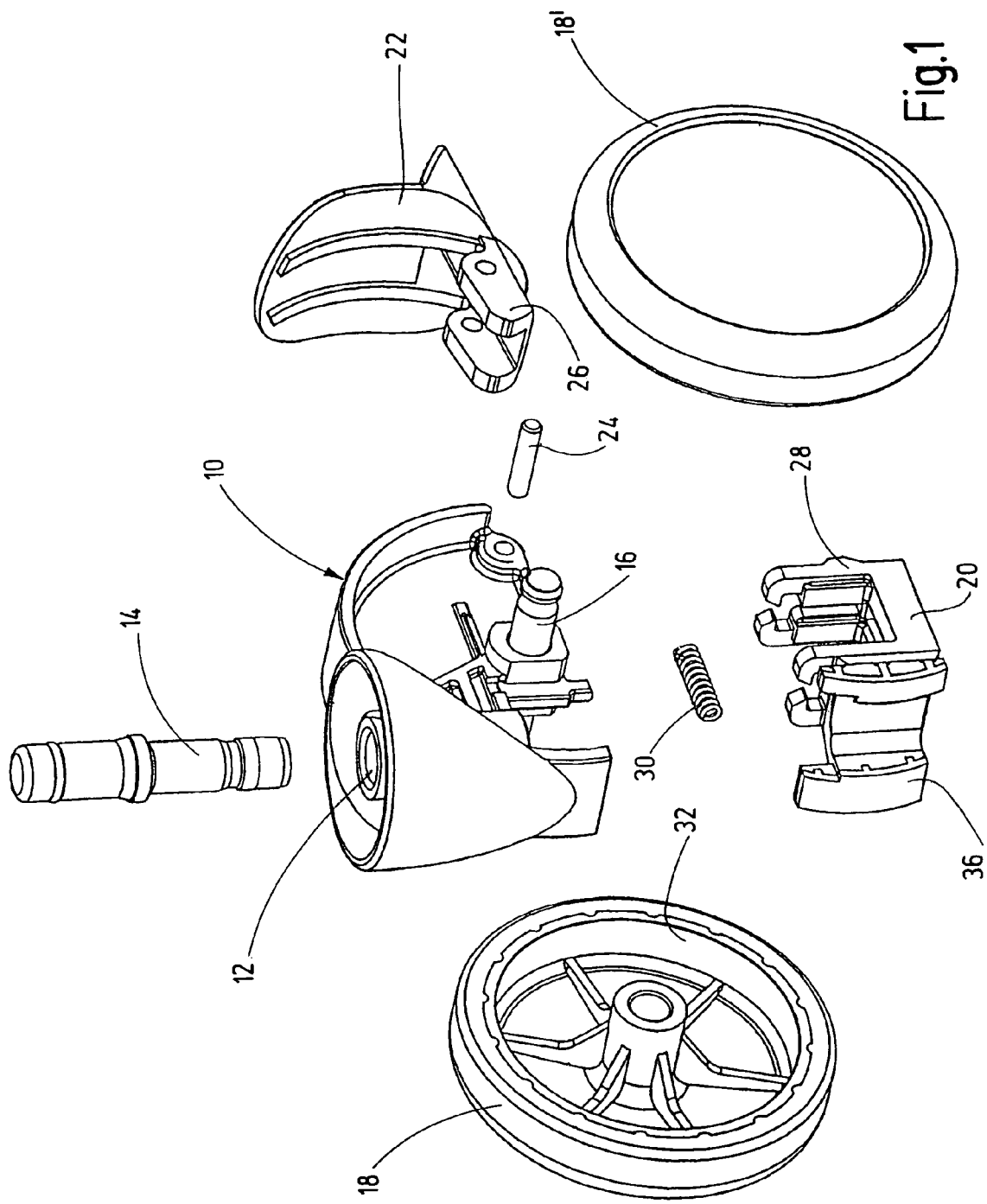

CASTOR WITH BRAKE DEVICE

BACKGROUND OF THE INVENTION

The invention relates to a castor having a brake device with a housing with a substantially vertically aligned receiving opening for a runner pin for connecting the castor to an object to be supported by the castor, and having an axle bolt which extends through the housing transversely with respect to the receiving opening and which bears at least one wheel, with the brake device having a brake slide which can be moved by means of an actuating lever from the outside from a free-running position into a braked position.

DESCRIPTION OF PRIOR ART

In known castors of said type, the at least one wheel has a radially inwardly pointing circumferential toothing which interacts with a complementary toothed segment of the brake slide. During locking of the castor, it may occur that the relative position of the two toothings is such that the teeth of one part cannot engage into the tooth spaces of the other part and thereby produce the positively locking action which locks the castor, but rather the teeth impact against one another with their tips, wherein the brake slide and the actuating lever become blocked and no locking of the wheel takes place. Furthermore, in the event of an overload, the brake device may "spin in the manner of a ratchet", wherein the toothing of one part or of both parts may be damaged. Furthermore, dirt can accumulate in the tooth spaces, which is disadvantageous if the castor is used in the medical field. Finally, for geometrical reasons, it is necessary for every wheel size to provide a corresponding brake slide, as a result of which the production expenditure for a series of different castors is increased.

OBJECT OF THE INVENTION

Taking this as a starting point, it is the object of the present invention to further develop a castor of the type specified in the introduction such that the above-mentioned disadvantages are eliminated.

To achieve said object, a combination of features is proposed, along with advantageous embodiments and refinements of the invention.

BRIEF SUMMARY OF THE INVENTION

The invention is based primarily on the concept of providing a brake device without toothings. Therefore, it is provided according to the invention that the brake slide bears an elastic brake lining which faces toward a braking section of the at least one wheel. To obtain as expedient a friction pairing as possible, it is provided in a preferred embodiment of the invention that the braking section of the at least one wheel is formed as a substantially smooth brake surface which faces toward the brake slide. By means of said measures, the castor can be locked securely and silently in any rotational position of the wheel. Furthermore, in each case, smooth surfaces of the brake device are relatively insusceptible to the accumulation of dirt. Furthermore, the brake slide with the soft brake lining can be used as a uniform component with different wheel diameters.

A good braking action is obtained if, in a further embodiment of the invention, the brake lining is composed of a thermoplastic polyurethane material. Here, the brake lining may be connected to the brake slide in a non-positively and/or positively locking fashion.

In some types of pivoting castors, it is advantageous if the brake device brakes not only the at least one wheel but rather additionally prevents a rotation of the castor body about the runner pin axis. To achieve this, the runner pin may have a section which projects into the movement path of the brake slide and which bears a brake pad arranged thereon in a rotationally fixed manner, and the brake slide may have a substantially U-shaped recess which receives the brake pad and which has a further brake lining, in such a way that during a braking of the at least one wheel, locking of the housing to the runner pin axis simultaneously takes place.

BRIEF DESCRIPTION OF THE DRAWINGS

The invention will be explained in more detail below on the basis of the exemplary embodiments schematically illustrated in the drawing, in which:

FIG. 1 shows an exploded illustration of a double castor having a brake device with an elastic brake lining;

DETAILED DESCRIPTION OF THE INVENTION

Figure 2A:
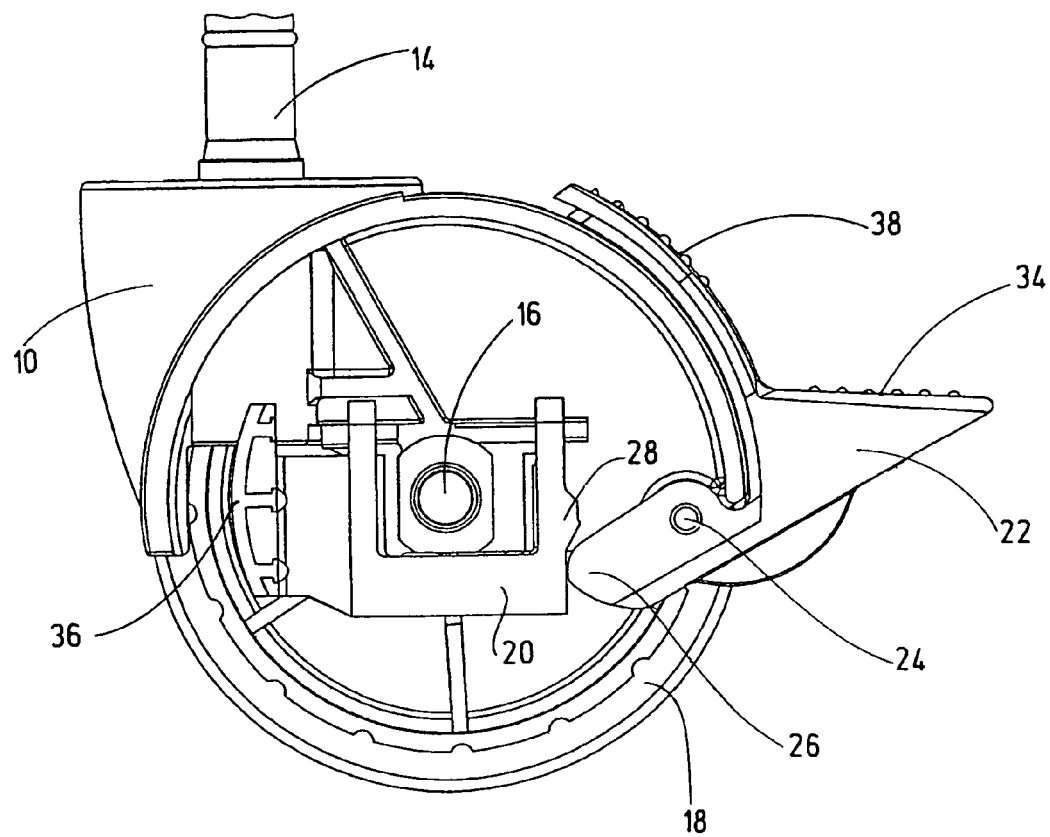
FIGS. 2*a* and *b* show longitudinal sections of the castor according to FIG. 1 in the non-braked position and in the braked position.

The castor illustrated in the drawing is a self-aligning double castor, such as is used for example on furniture, containers, medical appliances and the like. The castor is composed substantially (FIG. 1) of a housing 10 with a receiving opening 12 for a runner pin 14 for connecting the castor to an item of furniture or the like, an axle bolt 16 which extends through the housing 10 transversely with respect to the receiving opening and on which two wheels 18, 18' are arranged, and a brake device which comprises a brake slide 20 and an actuating lever 22 for the brake slide. The actuating lever 22 is pivotably mounted on the housing 10 by means of an axle 24 and has a cam section 26 which acts on the rear side of the brake slide 20, while a latching projection 28 (FIG. 2) for the cam section 26 is provided on the rear side of the brake slide 20. The brake slide can be moved, counter to the force of a pressure spring 30 which is supported in the housing 10, in the direction of a brake surface 32 of the wheel 18, 18'.

Figure 2B:
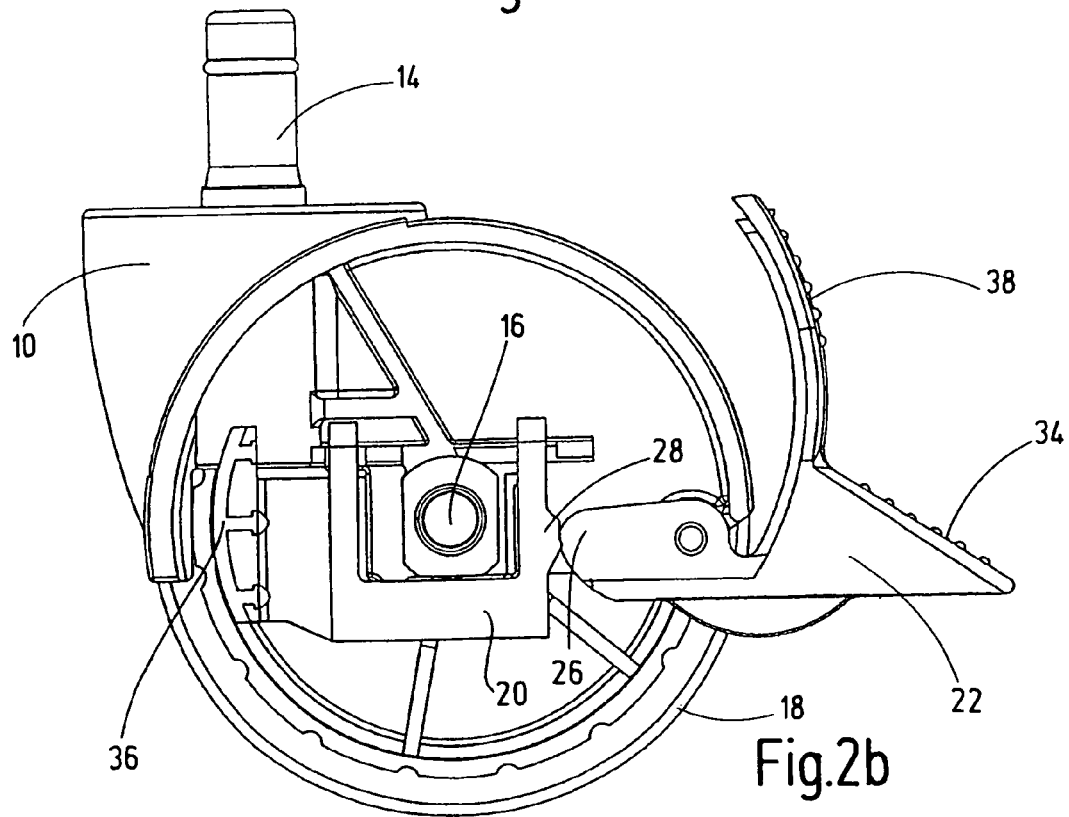
Figure 3:
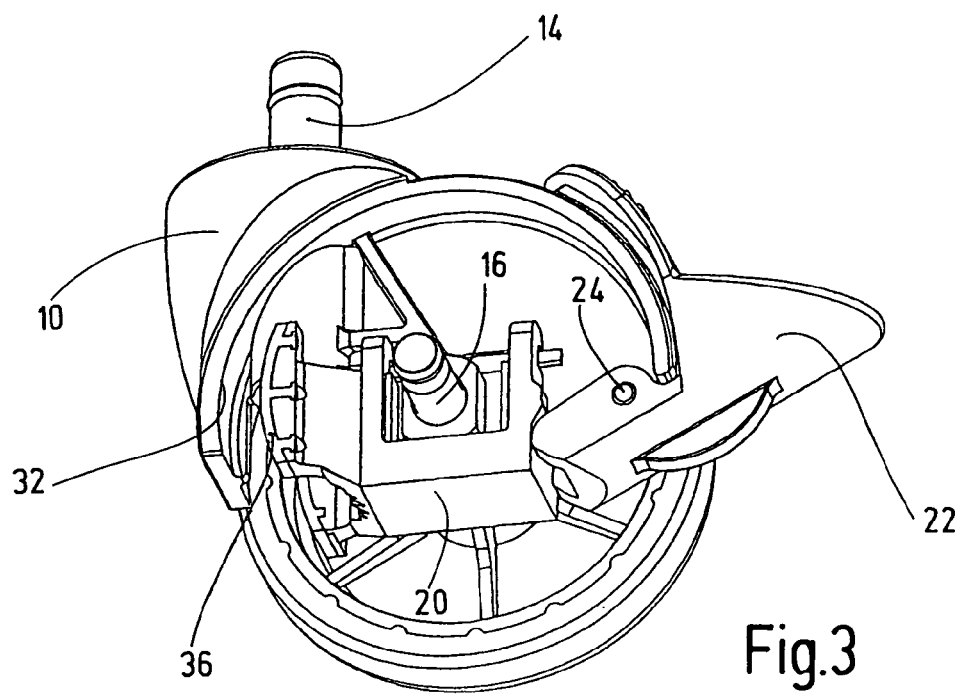
FIG. 3 shows a perspective view of the partially assembled castor according to FIG. 1.

FIG. 2*a* shows the castor in the non-braked state. By applying pressure to the surface 34 of the actuating lever 22, the latter is pivoted clockwise about the axle 24. Here, the cam section 26 forces the brake slide counter to the restoring force of the spring 30 in the direction of the brake surface 32 of the wheel 18, 18' until the cam section 26 runs against the latching projection 28 and latches there into a latching notch. A brake lining 36 (two individual linings in the drawing, which are in each case assigned to the brake surface 32 of one of the wheels 18, 18') arranged on the front side of the brake slide 20 is hereby pressed with a predetermined force against the brake surface 32 of the wheel 18, 18', as a result of which the wheel is blocked in any desired position. The brake lining 36 is expediently composed of an elastic material with a friction value coordinated with the brake surface 32 of the wheel 18, 18'. By targetedly setting the friction value and/or the contact pressure of the brake lining against the brake surface, the braking force can be set to the desired or required value. For example, a certain degree of slip may be predefined such that the castor is not completely blocked in the brake position but rather is merely made more or less stiff in terms of movement. Such a variation of the braking force is not possible with conventional toothed brake devices. To release the brake, pressure is applied to the surface 38 of the actuating lever, as a result of which the cam section 26 is released from the latching projection 28 and, assisted by the spring 30, pivots counterclockwise back into its initial position illustrated in FIG. 2a.

Figure 4:
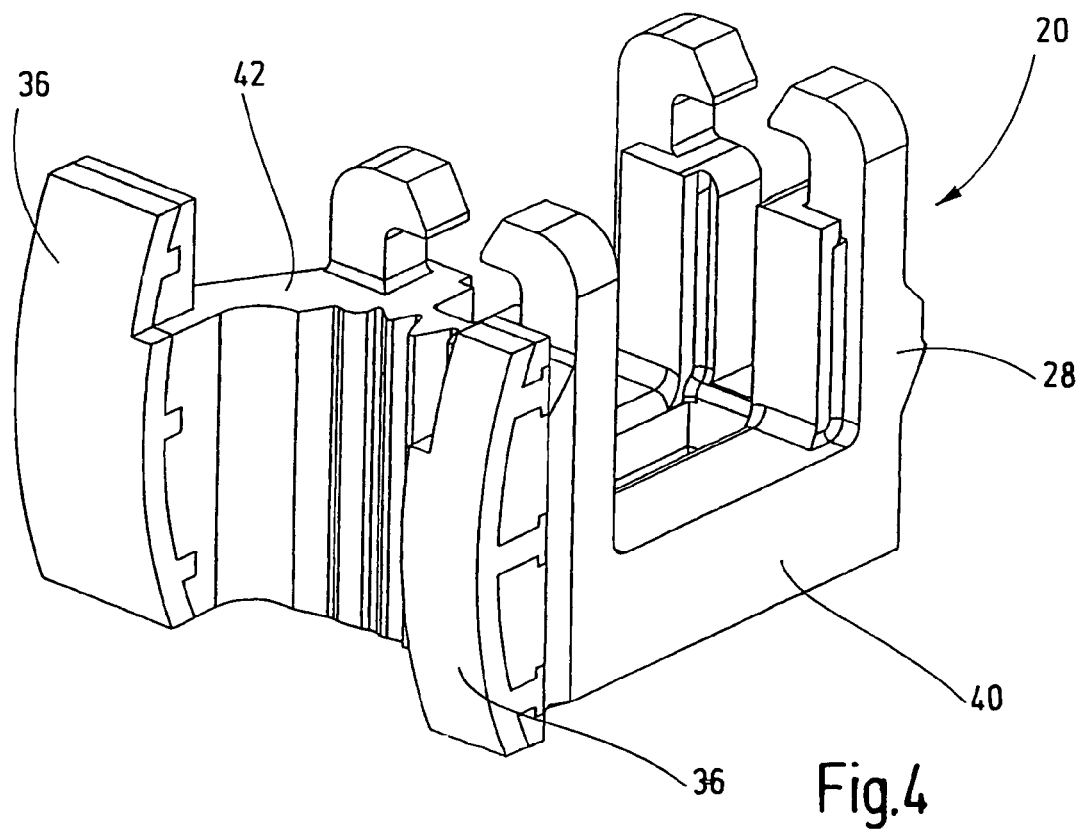
FIG. 4 shows an enlarged illustration of the brake slide of the castor according to FIG. 1.

FIG. 4 shows an enlarged illustration of the brake slide 20 in a perspective view. The brake slide is composed of a yoke part 40 which is latched onto guide rails of the housing from below and, with a recess, encompasses the region of the axle bolt 16. The yoke part 40 is connected in a materially integral fashion to a support part 42 for the brake lining 36, wherein said parts may however also be formed as separate parts which are welded, adhesively bonded or latched to one another during assembly. The brake lining is composed of a different material than the support part 42 and is connected to the latter in a non-positively and/or positively locking fashion.

Figure 5:
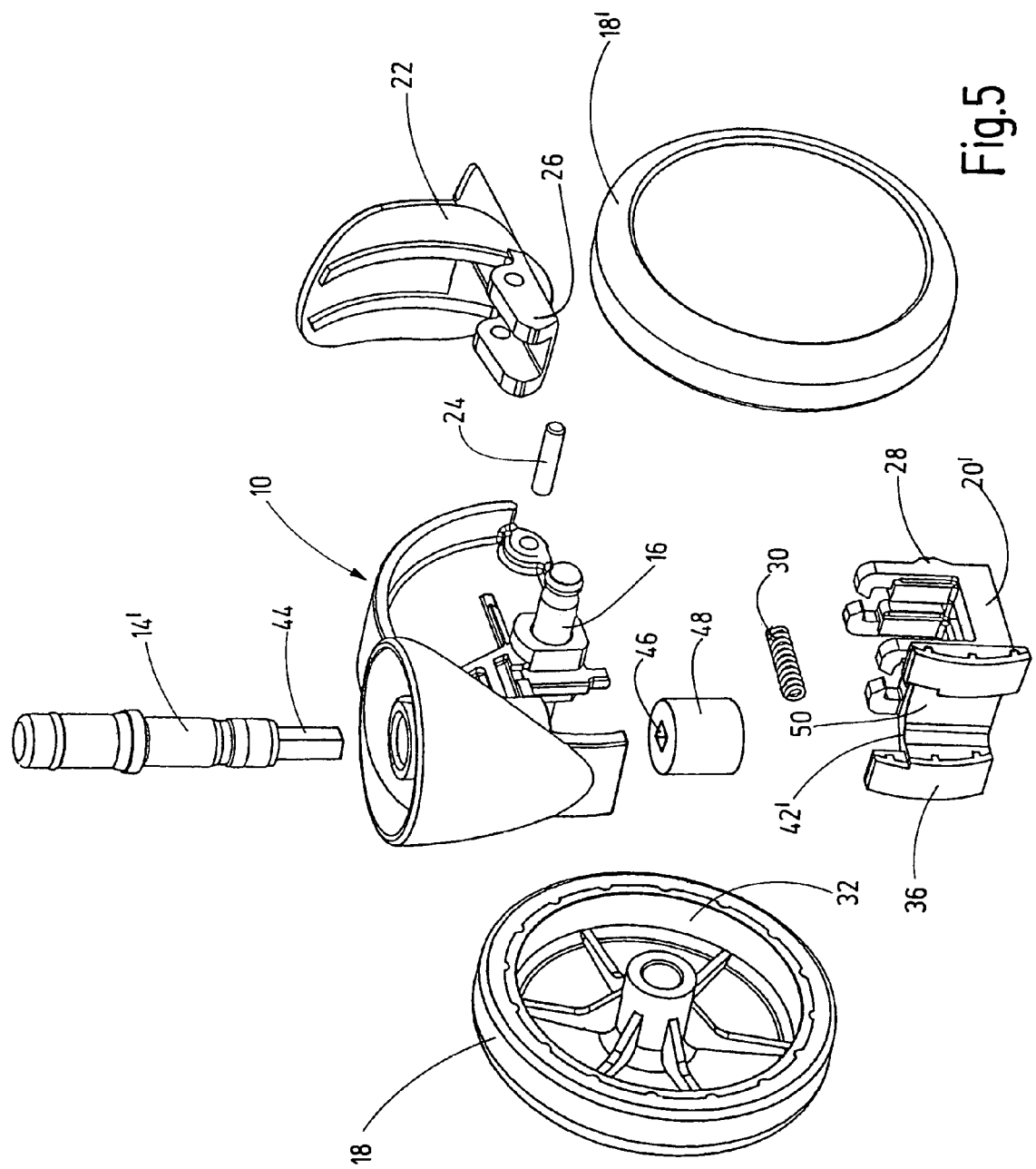
FIG. 5 shows an embodiment of the double castor with a total locking means.

In the castor illustrated in FIG. 5, locking of the castor about the vertical axis (the axis of the runner pin 14') is also provided in addition to the braking of the wheels 18, 18'. The housing 10, the wheels 18, 18' and the locking lever 22 correspond substantially to the parts illustrated in FIGS. 1 to 4. The runner pin 14', however, has a square section 44 which projects into the housing interior and which bears a brake pad 48 which has a corresponding receiving opening 46 for the square part. The brake pad is composed of a material with a suitable friction value, for example a thermoplastic polyurethane like the brake surfaces 32 of the wheels 18, 18'. The support part 42' of the brake slide 20' is provided, in its central region which is offset rearward (in the direction of the axle bolt 16), with a further brake lining 50. The dimensions of the brake slide, in particular the relative position of the brake linings 36 and 50 in relation to one another, are dimensioned such that during a braking of the wheels 18, 18', the brake lining 50 is simultaneously pressed against the brake pad 48, as a result of which both a rotation of the wheels and also a rotation of the housing 10 about the runner pin axis is prevented (total locking).

In summary, the following can be stated: the invention relates to a castor having a brake device, having a housing 10 with a substantially vertically aligned receiving opening 12 for a runner pin 14 for connecting the castor to an object to be supported by the castor, and having an axle bolt 16 which extends through the housing transversely with respect to the receiving opening and which bears at least one wheel 18, 18', with the brake device having a brake slide 20 which can be moved by means of an actuating lever 22 from the outside from a free-running position into a braked position. To provide inter alia a locking facility independently of the rotational position of the wheel, it is proposed according to the invention that the brake slide 20 bears an elastic brake lining 36 which faces toward a braking section 32 of the at least one wheel.

The invention claimed is:

1. Castor having a brake device, having a housing (10) with a substantially vertically aligned receiving opening (12) for a runner pin (14) for connecting the castor to an object to be supported by the castor, and having an axle bolt (16) which extends through the housing transversely with respect to the receiving opening and which bears at least one wheel (18, 18'), with the brake device having a brake slide (20) which is moved by means of an actuating lever (22) from the outside from a free-running position into a braked position, characterized in that the brake slide (20) bears an elastic brake lining (36) which faces toward a braking section (32) of the at least one wheel (18, 18'), wherein the runner pin (14) has a section (44) which projects into the movement path of the brake slide (20) and which bears a brake pad (48) arranged thereon in a rotationally fixed manner.

2. Castor according to claim 1, characterized in that the braking section (32) of the at least one wheel (18, 18') is formed as a substantially smooth brake surface which faces toward the brake slide (20).

3. Castor according to claim 1, characterized in that a section of the brake lining (36) which acts on the braking section (32) is formed with a substantially smooth surface.

4. Castor according to claim 1, characterized in that the brake lining (36) is composed of a thermoplastic polyurethane material.

5. Castor according to claim 1, characterized in that the brake lining (36) is connected to the brake slide (20) in a non-positively and/or positively locking fashion.

6. Castor according to claim 1, characterized in that the brake slide (20) and/or the brake lining (36) are/is formed as a uniform part for wheels of different diameter.

7. Castor according to claim 1, characterized in that the brake slide (20) has a substantially U-shaped recess which receives the brake pad (48) and which has a further brake lining (50), in such a way that during a braking of the at least one wheel (18, 18'), locking of the housing (10) about an axis (14') of the runner pin (14) simultaneously takes place.

\* \* \* \* \*